April 8, 1941.    E. W. BECK ET AL    2,238,008
LIGHT CONDITIONING DEVICE AND METHOD OF MANUFACTURING SAME
Filed Jan. 20, 1939    2 Sheets-Sheet 1
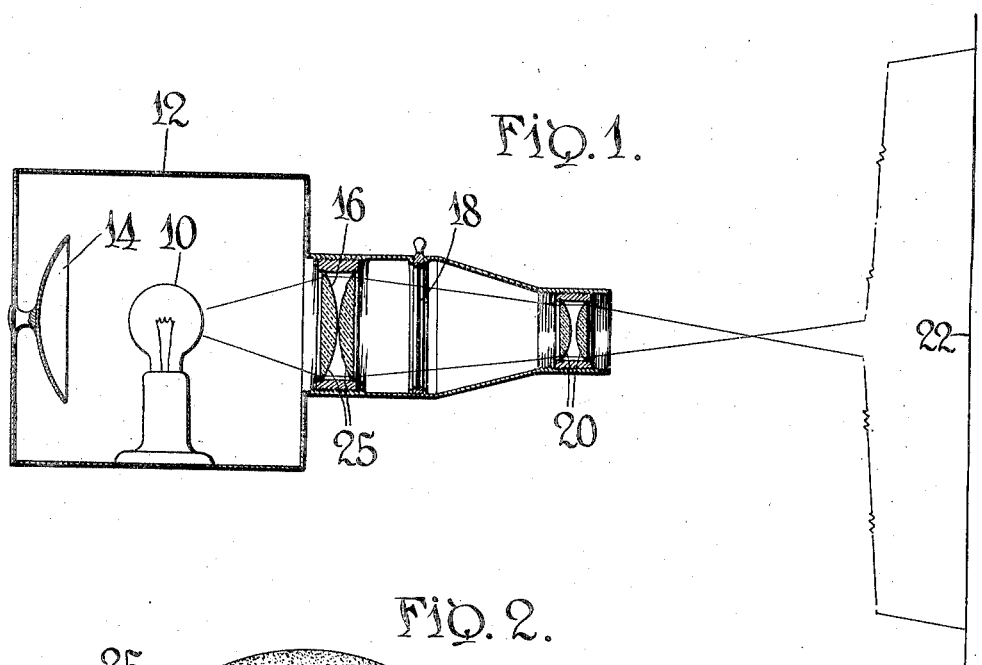
Fig. 1.
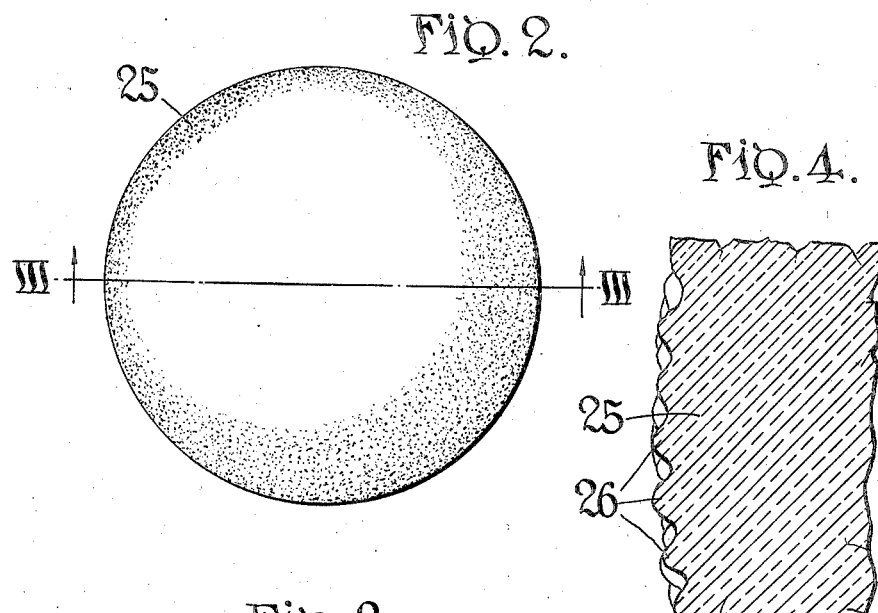
Fig. 2.
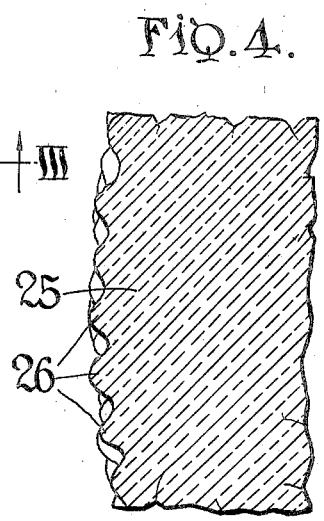
Fig. 4.
Fig. 3.
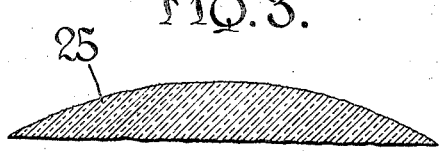
INVENTORS
EARL W. BECK &
VICTOR WALKER
BY
Bean, Brooks, Buckley & Bean.
ATTORNEYS April 8, 1941.  E. W. BECK ET AL  2,238,008
LIGHT CONDITIONING DEVICE AND METHOD OF MANUFACTURING SAME
Filed Jan. 20, 1939  2 Sheets-Sheet 2
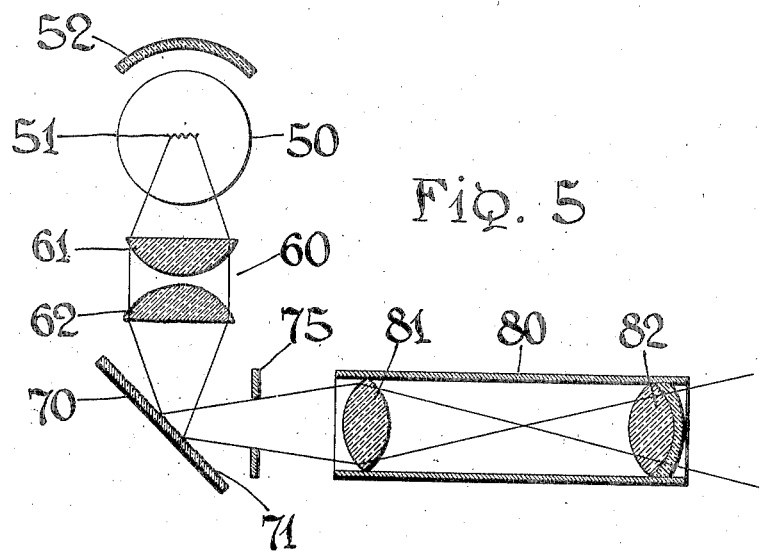
Fig. 5
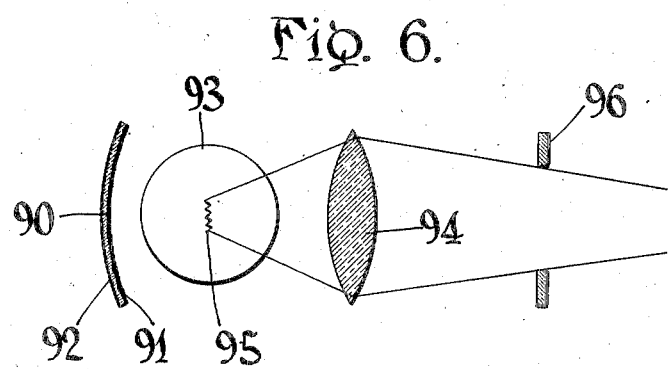
Fig. 6.
Fig. 8.
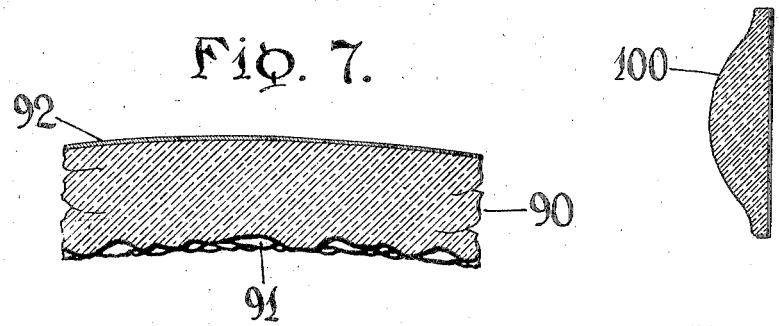
Fig. 7.
INVENTORS
EARL W. BECK &
VICTOR WALKER
BY
Bean, Brooks, Buckley & Bean.
ATTORNEYS Patented Apr. 8, 1941

2,238,008

UNITED STATES PATENT OFFICE 2,238,008

LIGHT CONDITIONING DEVICE AND METHOD OF MANUFACTURING SAME

Earl W. Beck, Eggertsville, N. Y., and Victor Walker, Fort Erie, Ontario, Canada, assignors, by mesne assignments, to AlnCin, Inc., a corporation of New York Application January 20, 1939, Serial No. 251,982

13 Claims. (Cl. 88—24)

This invention relates to light and/or image projecting apparatus, and has for one of its objects the provision of an improved light transmitting system that is capable of more efficient use of the light emanating from the light source element of the apparatus. Another object of the invention is the elimination of undesirable spherical and/or chromatic aberration effects in lenses in a greatly simplified and improved manner. Another object of the invention is the production of a light condensing system that produces a perfectly diffused beam of transmitted light in combination with reduced transmission loss effects.

Previous method attempting to correct spherical and chromatic aberration effects in illuminating apparatus and light projection systems include endeavors to provide true aplanatic and achromatic lenses in the form of composite lens structures employing different types of glasses of carefully designed and prepared surface forms. Such lens constructions are relatively expensive to manufacture; only partially successful from the standpoint of aberration elimination; structurally fragile; and, if cemented together, are unsuited for use in the region of high temperatures such as exist adjacent the light source element in most types of light projecting apparatus. Also, it has been observed that the use of different types of glasses, such as crown and flint glass, in composite lens structures directly introduces a further transmission loss effect because of the adverse light wave alteration effects resulting from the different transmitting characteristics of the respective mediums.

Also, simple lenses of special shapes have been designed with a view to reducing chromatic aberration effects; but inasmuch as such lenses are formed with aspherical surfaces, their manufacture has heretofore involved extreme difficulty in connection with the final grinding and polishing thereof, and they have therefore been so expensive that their use is prohibited in most cases.

It is well known that color dispersion effects in simple lenses are most prominent in the region about the outer margin of the projected beam; and another method that is sometimes employed for eliminating a portion of the undesirable results of color dispersion effects of chromatic lenses is to mask out the outer marginal edge portion of the beam of projected light wherein the chromatic aberration effects are most pronounced. Such arrangements involve lower first cost and may provide for some purposes sufficient removal of unnatural coloring effects; but the use of such systems are accompanied by direct loss of a substantial portion of the light emanating from the light source and are at best only makeshift compromises in the interest of low first cost. Such light losses, in addition to being economically undesirable, necessitate the use of oversize light source means, and in some cases such light loss effects will definitely limit the maximum light projecting possibilities to below desideratum.

Also, in the case of prior forms of condenser lens units, it has been found that the intensity of the chromatic aberration effect in the region of the outer marginal portions of such lenses increases rapidly with increases in the degree of lens surface curvature.

Consequently, it has been found impracticable to employ a single spherical lens in close proximity to the light source because of the fact that when disposed in such position a single condenser lens must be designed with substantial curvature in order to properly converge transmitted light rays upon the objects to be illuminated. For this reason it has therefore become accepted practice to provide the condenser unit in the form of two or more lenses, whereby the total required refractive power is divided between the lenses of the unit, and the individual lenses may therefore be of reduced degrees of surface curvature and magnification of the undesirable chromatic aberration effect is partially avoided.

In moving picture projection operations it is most important to provide an even illumination of the film aperture, and it has therefore been heretofore necessary to provide the condenser lens unit of a form that is devoid of spherical aberration. Otherwise the film will be illuminated with zones of various light intensities, and the image of the film reproduced upon the screen will be made up of "ghosts" and "shadows." Previous methods of correcting for spherical aberration include the construction of aplanatic lenses of non-spherical surface forms. Naturally, such lenses are relatively expensive to manufacture because they require laborious manufacturing operations and extreme skill in design and construction.

Consequently, high performance light projecting apparatus such as for use in connection with object illumination and image projection in photography, and the like, have been heretofore developed along the lines of compound lens arrangements which possess the disadvantages of being complicated and very expensive to manufacture. Also, such previous forms of apparatus have usually been unsuccessful from the standpoint of complete elimination of chromatic and spherical aberration effects. In the case of color photography the disadvantages and objections to such defects become of magnified seriousness, and for some time past it has been apparent that the ultimate commercial success of that science will depend to a large extent upon the development of ways and means for reproducing true objective colors in accurate form.

Another disadvantage attending the use of conventional type condenser lenses results from the presence of bubbles, striae or foreign particles which may be included within the body of the lens material. In such case the lens will project a shadow of the inclusion toward the screen, and will thus illuminate the film in non-uniform manner.

The present invention contemplates the provision of a novel form of lens that avoids the above objections and disadvantages and may be manufactured by simplified methods from an easily produced basic contour and which is capable of transmitting light with unimpaired efficiency in combination with complete light diffusion, and whereby chromatic dispersion and spherical aberration effects due to the shape of the lens contour are compensated for by subsequent recombination of the projected beam rays. Thus, a projected beam of unimpaired intensity and substantially achromatic properties throughout the entire beam section is provided; while at the same time the lens is incapable of projecting an image of the light source.

Notwithstanding the fact that it is well known that the region of maximum light intensity in the beam projected by a condensing lens is at its focal point, in previous types of image projecting apparatus the condenser is usually disposed closer to the light source than at the focal distance so as to avoid projection of an image of the light source which would otherwise superpose non-uniform light values upon the desired projected object image. A single lens of the invention may be employed as the condensing unit of a light projection apparatus, and said lens may be arranged with relation to the light source in such manner as to converge a beam section of maximum intensity without formation of a light source image.

It is well known that each surface of a lens reflects a substantial portion of the light coming to it, and that in some cases this loss of light by reflection equals up to 8 or 10% for each lens. Consequently, it is recognized that any simplification and reduction of the number of lenses necessarily employed in any light transmitting system such as a condenser unit will be of great advantage. Because of the fact that the lens surface of the invention eliminates spherical and chromatic aberration effects in single lenses of generally spherical surface contour and therefore obviates the necessity of employing multiple lens units, it will be seen that the invention is of marked utility and advantage in the light projection industry. Also, if desired, the lens of the invention may be of maximum surface curvature without production of undesirable chromatic aberration effects.

The invention may also be provided in the form of a novel and improved form of light reflecting element incorporated in a light or image projecting system, either in combination with conventional types of lens structures or in combination with the improved types of lens structures of the invention; and in either case the employment of the novel reflector structure will reduce spherical and/or chromatic aberration effects and a more uniform illumination throughout the transmitted beam section will be provided.

In the drawings:

Fig. 1 is a diagrammatic illustration of a picture projection apparatus of the invention;

Fig. 2 is an elevation of a novel lens element of the invention;

Fig. 3 is a section through the lens element of Fig. 2;

Fig. 4 is a fragmentary section, on an enlarged scale, of a portion of the lens element of Figs. 2 and 3;

Fig. 5 is a diagram of another form of picture projection apparatus incorporating features of the invention;

Fig. 6 is a diagram of still another form of light projection apparatus incorporating features of the invention;

Fig. 7 is a fragmentary sectional view, on an enlarged scale, of the reflector element of the apparatus of Fig. 6; and Fig. 8 is a sectional view of an aspherical type lens.

As illustrated in Fig. 1, a projection apparatus of the stereopticon type employing a light source 10 in the form of an incandescent lamp housed in a casing 12 is employed. A concave mirror 14 is shown as being provided behind the lamp 10 to assist in concentrating a substantial portion of the rays therefrom into a beam directed toward a condensing lens unit 16. The condensing unit 16 is illustrated as being in the usual form of a pair of lenses 25, and is adapted to gather the rays of light transmitted thereto and to project them forwardly in converging relation upon the picture transparency 18. Thus the object to be projected is illuminated. An objective lens unit 20 is mounted in the usual manner beyond the transparency 18 and in proper adjusted relation therewith so as to project a real image of the illuminated object of the transparency 18 upon a screen 22; the projected image being enlarged by providing the objective lens unit 20 of magnifying character.

As is well known in the optical art, chromatically uncorrected condenser lenses produce color dispersion in connection with light ray deviation, with the result that the light beam projected therefrom comprises a series of concentric rings of differently colored light ranging from red to violet. This segregation effect is emphasized in the region of the outer marginal edge portion of the beam section. Consequently, unless correction of this color segregation is effected, the objective transparency 18 of the apparatus illustrated will be illuminated by a beam of light comprising divided zones of differing color characteristics whereby the light projected upon different portions of the objective area will be of different intensities and unnaturally colored; and the coloring and light tone values of the image projected upon the screen will be false.

Previously, as a possible means of correcting the color dispersion action hereinabove described, attempts have been made to provide the condenser and objective lens units of a chromatic character, as by providing a compound lens structure employing multiple lenses of different curvatures and of different qualities of glass whereby deviation without dispersion is sought. The degrees of success of such attempts are dependent upon the care and exactitude of the operations concerning the design and manufacture of the lens unit, and such methods invariably involve either considerable expense or incomplete attainment of the objects sought. Also, simple lenses of aspherical surface forms have been designed with a view to reducing the effect of the chromatic aberration phenomenon, but the manufacture of such lenses has also heretofore involved extreme difficulty and expense in connection with the final grinding and polishing operations. This is because of the fact that the grinding and polishing plates cannot be moved radially with respect to the optical axis of such lenses but may only be given rotary movement thereabout. Consequently, when conventional abrasion type final finishing operations are applied to such lenses it is extremely difficult to produce a uniformly curved sectional contour and to avoid the formation of annular ridges and recesses thereon. Consequently, such previous manufacturing processes have invariably involved workmanship of the highest order and great expense. Wherever the expense accompanying the use of such previous forms of achromatic type lens structures would be prohibitive, oversize uncorrected lenses are sometimes employed in the condenser unit, and the most pronounced portion of the chromatic effect thereof in the region of the outer margin of the projected beam is simply masked out by the use of a reducing window or mask between the condenser unit and the transparency 18. Consequently, the film 18 is disposed closer to the condenser unit 16 than would otherwise be the case in order to bring the entire film area into the field of the unmasked portion of the projected beam. Thus, it will be seen that a substantial portion of the light projected through the condenser unit will be masked out and completely lost; and in some cases this masked out portion of the light has been found to be equal to 50% of the condenser unit beam. Nevertheless, the unrestricted portion of the projected beam is only partially freed of chromatic aberration effect, inasmuch as the color dispersion phenomenon takes place throughout the entire body of the lens and is not limited to the marginal edge portion thereof.

As distinguished from the above systems, the present invention employs a novel lens unit 25 (Figs. 1, 2, 3 and 4) which may be formed in a preferred manner as described in our copending application Serial No. 232,920. As explained therein, the lens is manufactured by first molding, casting, pressing, grinding or otherwise forming a body of glass of the desired optical characteristics into spherical surface form of the desired curvature as may be required in any given instance. That is, the required general contour may be of double convex form or of plano-convex form as illustrated in Figs. 1 to 3, or of whatever other general form may be required for any given instance of light ray condensing operation. The outer surface portions of the lens are then serrated, as for example by an abrasion process whereby the surfaces are provided of "ground glass" form. If the general form of the lens has been previously arrived at by means of a grinding process, the outer surfaces thereof will perhaps already be in proper "ground glass" form and ready for the next step of the manufacturing process. However, if the lens has been prepared in its general form by some other type of process such as by molding or pressing, casting, or the like; then some form of abrading or grinding or etching operation is next required to give the outer surfaces thereof the form and appearance of ordinary "ground glass."

The next step of the manufacturing process involves application to the ground glass surface of an acid treatment in the form of a bath comprising a mixture of hydrofluoric and sulphuric acids, or other suitable combination of acids. The acid bath treatment is of such character as to provide a cleansing and polishing of the lens surfaces as distinguished from an etching action. Thus, a perfectly transparent lens surface of highly polished form is produced; and the surface portions thereof will be found to be in the form of series of closely spaced outwardly extending cusps 26 (Fig. 4), which under the microscope appear as closely packed peaks of transparent and highly polished wall form.

The outer surface portion of the lens 25 may be prepared of serrated form preparatory to the acid bath treating step of the manufacturing method by any other suitable form of process, such as abrading, grinding, scratching, attrition, acid etching, or pressing processes, whereby the surface contour is disrupted by minute serrations. For example, one form of abrading process that has proven to be particularly successful involves a fine grinding of the glass surface by means of loose carborundum dust. The cusps 26 so produced are generally of pyramidal form and relatively closely spaced, and their surfaces are found to be minutely scratched and coated with accretions of fused or cemented powdered glass particles. Thus, the cusp surfaces are first of non-transparent form and are of relatively low translucency. By reason of the subsequent acid bath treating step of the manufacturing method, however, this accretion material is removed and the cusp surfaces are left in somewhat rounded and highly polished condition.

In connection with the acid treating step of the process a mixture of hydrofluoric and sulphuric acids in the approximate proportions of one to five by weight, respectively, is preferred; and the acid process is carried out by dipping the serrated lens in the acid mixture at an elevated temperature and for the necessary length of time to permit a complete clearing away of the accretion material and any other locally irregular or otherwise imperfect surface material. Preferably, the glass base is alternately immersed and withdrawn from the acid bath and then rinsed with fresh water to assist in the removal of the accretion material from the base, and these steps of the process are repeated any desired number of times until a completely transparent and polished surface is produced.

It is contemplated that in lieu of the hydrofluoric and sulphuric acid mixture hereinabove described, the acid polishing step in connection with the preparation of the novel lens structure may be accomplished by means of any other suitable acids or acid combinations, or other chemical reagents; the feature of the invention being that a highly polished surface comprising series of closely packed domes or peaks is produced whereby complete light diffusion and aberration effect correction is obtained.

There is thus produced a novel article of manufacture having a surface in the form of a series of closely packed domed cusps of microscopic dimensions (Fig. 2), whereby each cusp provides locally light ray refraction and beam diffusion of a very fine order. The dispersion effects of the cusps are of course also of microscopic order, and by reason of the close proximities of the cusps to one another and the multitudinous and microscopical character of the dispersion effects, a complete remixing of the refracted emergent rays is established in the projected beam, and thus a substantial correction for color dispersion and spherical aberration effect due to the spherical lens surface curvature is obtained; and the light emitting from the lens appears to be substantially of uniformly diffused and achromatic character. By reason of the complete removal of the accretion material from between the cusps and the highly polished nature of the finished surfaces of our material, the product is of extreme intrinsic brilliancy and by actual tests has proven to be substantially equal in light transmission efficiency to optically polished smooth surfaced glass of the same chemical constituency.

Also, because of the minutely broken form of the surface contour of the lens, it will transmit light with a reduced light reflection loss as compared to previous smooth surface forms of lenses employed for the purpose at the same time. Because the cusp arrangement of the lens surface is without regular pattern, adjacent portions of the lens provide no generally noticeable light beam segregation effects, whereby a projected beam of substantially uniform light values throughout the beam section is provided.

It is contemplated that both of the major surfaces of the lens may be prepared in accordance with the method just described; or in the alternative, the light receiving surface thereof may be formed in any other desired optical finishing manner so as to provide complete transparency therethrough. For example, the light ray emergent surface of the lens may be ground and acid polished as above described and the other surface then ground and mechanically polished in accord with the usual lens grinding and polishing methods. The entire lens will then be highly polished and capable of transmitting light without appreciable loss. At the same time, the minute cusp-like formation of the light ray emergent lens surface will provide multitudinous light ray refractions throughout the entire projected beam section, and a consequent light diffusion of such minute and complete character that correction of any chromatic and/or spherical aberration effects is produced. Thus, when employed as a condenser unit, the lens 25 produces convergence of the light rays transmitted to it from the light source without ultimate chromatic and/or spherical aberration effects that are apparent to the human eye; and this result is found to obtain throughout the entire section of the projected light beam.

Consequently, if the light source element 10 of Fig. 1 is of such type as to produce a true or daylight type light none of the light projected through the condenser unit need be masked out or otherwise eliminated and the object 18 will be evenly and correctly illuminated. The transparency 18 is consequently disposed at a greater distance away from the condenser unit as compared to previous systems wherein a marginal mask is employed, and the objective transparency will be completely within the projected beam of the condenser unit and will be illuminated by a beam of light of uniform intensity throughout its section and of the same color characteristics as the light source 10, without spherical and/or chromatic aberration effects. Hence all of the light directed toward the condenser unit by the light source 10 and the reflector 14 will be usefully projected through the transparency 18 toward the screen 22; and consequently, a greatly increased efficiency with respect to the ratio of the light input to light output will be experienced. Thus, without using expensive and/or complicated forms of compound lens structures, an apparatus is provided which is adapted to project light and/or an image in uniformly true light value and color form in combination with increased light utilization efficiency.

It will be apparent that the dimensions and relative arrangements of the cusps may be provided of varied form, and that they may be accurately controlled as to form by varying the degree of fineness of the abrading or serrating operation hereinabove described. For example, if a grinding type operation is employed it is preferably performed by means of a sized loose abrasive under a rapidly revolving wheel of iron or other suitable material. However, as explained hereinabove, any other suitable form of controlled serrating operation, such as sand blasting; acid etching; molding; pressing; or the like may be employed for providing the minutely serrated surface form preparatory to the acid treatment portion of my manufacturing operation. It is also contemplated that the cusps of the invention may be of a variety of dimensions and dimensional proportioning as may be required to procure light transmitting and diffusing characteristics of different order. For example, it has been found that good results may be obtained with a lens wherein the cusps are of altitudes of the order of $\frac{1}{200}$ of an inch and measure in the region of $\frac{1}{100}$ of an inch across their bases. However, it is contemplated that either one or both of these dimensions may be varied without reference to the other.

It will be apparent that this novel process of lens manufacture involves only a few manufacturing steps of relatively simple and inexpensive character. Also, because of the fact that the finished lens is provided with a surface of mottled appearance (Fig. 2) certain types of imperfections in the glass base 10, if present, may be overlooked without commercial disadvantage. For instance, the glass base material of optical lenses often includes minute gas bubbles or striae or the like which would detract from the commercial acceptance thereof when made into conventional forms of lenses which are of smooth surfaces and highly polished form, and wherein the included imperfections would be readily apparent to the eye. Such imperfections ordinarily produce shadows and chromatic aberration effects in the projected beam, but these effects will be corrected by the diffusing action of the cusp type surface of the lens constructed in accordance with this invention. Also, in such case, the imperfections will not be readily apparent to the eye due to the mottled surface appearance of the lens and will not be otherwise objectionable.

It is contemplated that the features of this invention may be applied to light and/or image projection apparatus either in connection with simple lens units or in connection with compound lens devices; and that the cusp producing steps of the invention may be applied to either one or both of the faces of such lenses. It is also contemplated that the cusp producing steps of the invention may be applied with particular facility to special non-spherical surface types of lenses with the result that certain manufacturing difficulties are avoided and important savings in manufacturing cost will be experienced. For example, as illustrated in Fig. 8, a non-spherical lens may be produced by cutting the general contour of the surface 100 thereof by means of a relatively coarse grinding operation, and the subsequent application of the acid treating step of the invention will produce the cusp type surface on the lens and simultaneously eliminate the imperfections of the grinding process which would otherwise produce undesirable refractive and light projection results. Thus, an efficient light transmitting lens that is generally corrected against spherical and/or chromatic aberration may be inexpensively manufactured as compared to the conventional type optical polishing methods previously required to produce this type of lens. It will be understood that when the lens of Fig. 8 is used in lieu of the lenses 25 of Fig. 1 or the lens 62 of Fig. 5 or the lens 94 of Fig. 6, the picture to be reproduced will be accurately illuminated without appreciable spherical and/or chromatic aberration effects. Hence, the picture reproduction will be of improved quality, and in the case of colored picture reproduction work when the light source element is as nearly as possible of the day light type, the improvement will be particularly noticeable and important because the colored picture will have been uniformly illuminated in the proper manner.

Because of the fact that the lens of the invention produces complete diffusion in combination with maximum light transmission ability, the lens is incapable of projecting an object image. Consequently, when used as a condenser unit of a light projection apparatus as in Fig. 1, and when located relative to the light source and the objective lens in such position as to provide maximum intensity of light beam section upon the objective lens, no image of the light source 10 is picked up by the objective lens 20 and the projected image is of uniformly true light tone value. Also, all of the light transmitted through the condenser will be usefully employed by the objective; while at the same time, the achromatic qualities of the lens avoids color dispersion effects in the light beam which would otherwise have to be diaphragmed out or corrected by means of additional complicated and expensive lens devices.

Because of the fact that the lens unit 16 (Fig. 1) is disposed further away from the light source without undesirable projection of light source image in the objective, the lens unit and the film 18 are both more favorably located with respect to the heat radiating from the light source 10. Thus, the problem attending the removal of excessive heat from the region of the condenser lens and picture carrying film is simplified. Because of the cusp-type surface of the lens, occasional surface scratches such as would produce undesirable effects in conventional transparent type condenser lenses, are avoided.

As shown in Fig. 5, the principles of the invention are applied to a motion picture type projection apparatus comprising generally a light source lamp 50, a condenser unit 60, a reflector 70, a film supporting aperture plate 75, and an objective lens unit 80. The lamp 50 is of the conventional incandescent type employing a filament 51. A reflector 52 is arranged behind the lamp 50 in the usual manner for redirecting light rays projected thereon toward the condenser unit 60. The condenser unit 60 is shown as comprising a pair of plano-convex lenses 61 and 62 which are relatively arranged in accord with standard practice with coinciding optical center lines and with their convex surface portions in adjacent but non-contacting relation. Thus, the lens 61 functions as a collector of light rays emanating from the filament 51, and the lens 62 functions as a converger of the rays transmitted thereto toward the reflector 70 which redirects the light at a 90 degree angle toward the aperture of the film guiding plate 75.

The objective lens unit 80 is constructed generally in accord with present day practice and may comprise, as illustrated, a double convex lens 81 and a spherically and achromatically corrected compound lens 82 which usually comprises a double convex lens section and a double concave lens section of different types of glass. Thus, the objective lens unit is designed to project an enlarged reproduction of the illuminated film upon a suitable screen (not shown), the reproduced image being aplanatic and correct as to coloring and light tone values.

In order that the film be properly illuminated with light of natural coloring and uniform tone values throughout the lamp 50 is provided of a type that will produce normal or "day light" type light, and the optical system between the lamp 50 and the film is so provided as to correctly transmit the light from the light source and to distribute it evenly over the film aperture without evident chromatic and/or spherical aberration effects. To this end the lens 62 may be provided with the surface form of the invention as hereinabove described; that is, at least the plano-surface thereof which is next adjacent the reflector 70 will be so provided. Thus, as explained hereinabove, the spherical and chromatic aberration effects produced within the lens structure by reason of the generally spherical surface contour thereof will be overcome and obviated by reason of subsequent remixing of the emergent light rays as a result of the local refractive powers of the cusp-type surface of the lens. Thus, the light rays transmitted by the lens 62 to the reflector 70 and redirected upon the film aperture will be completely mixed, and an evenly distributed light of proper color characteristics will be projected upon the film.

It will be understood that in lieu of the arrangement above, the cusp-type surface of the invention may be employed with good effect upon both faces of the lens 62 as in the case of the apparatus of Fig. 1. Also, if desired in addition, the novel surface form may be provided upon either one or both of the faces of the lens 61; thus multiplying the extent of correction of spherical and/or chromatic aberration effects in the film illuminating system. Also, it has been found that the reflector 70 may be provided with an outer surface 71 of the cusp type as hereinabove described, it having been found that substantial correction of spherical and/or chromatic aberration effects in light beams transmitted thereby may thus be obtained. For this purpose it will be understood that the reflector 70 may be manufactured generally in accord with the manufacturing steps hereinabove described; that is, the glass base structure is ground or otherwise provided with series of fine serrations throughout its outer light receiving surface preparatory to application of the acid polishing treatment hereinabove described to provide the cusp type surface 71. The base or rear surface of the glass sheet is then silvered or otherwise provided with suitable opaque reflecting material in the manner of conventional mirror making practice. It has been found that this form of reflector will provide diffusion and substantial correction of spherical and/or chromatic aberration effects in light beams projected upon the reflector and redirected thereby toward the film aperture. Thus, when employed either in combination with conventional type condenser lenses or with the novel form of condenser lens hereinabove described, the reflector 70 will improve the illuminating characteristics of the light beam projected upon the film aperture, and will permit more advantageous relative dispositions of the light source, condenser unit, and film aperture in a manner similar to that of the novel condenser lens construction hereinabove described.

Fig. 6 illustrates another form of the invention wherein a reflector 90 behind the light source lamp 93 is provided of the improved light diffusing surface form 91 and silvered rear surface as at 92. In this respect, it will be understood that the reflector 90 will be constructed in a manner similar to that of the reflector 70 of Fig. 5 and as hereinabove described, with the exception that the reflector 90 is of curved sectional form to provide in addition a light ray condensing action whereby the reflected rays will be convergent upon the condenser lens 94 of the system. It will be understood that the reflector 90 may be of any desired curvature form whereby the reflected light rays will be converged in the most useful manner. In any case, however, it will be seen that the novel surface form of the reflector unit will provide complete diffusion of all light rays reflected thereby and substantial correction of undesirable spherical and/or chromatic aberration effects that would otherwise be evident in the reflected light beam. Thus, the novel form of the reflector 90 contributes to the perfection of the quality of the illumination of the film, and improved image reproduction is thereby obtained.

It will be understood that the invention contemplates the provision of an improved optical system comprising novel forms of lenses and/or reflecting elements which are relatively arranged in a novel and improved manner whereby certain objections and disadvantages of previous light and/or image projecting systems have been obviated; and that application of the invention to otherwise conventional forms of light and image projection apparatus provides improved performance at lower manufacturing expense.

What is claimed is:

1. In a light conditioning system including a light source, a light directing and conditioning device of non-image-forming and non-image-retaining and efficient light transmitting characteristics and comprising a glass body having one of its optical faces ground to a prescribed optical contour to provide a continuous optical surface comprising contiguous minute cusps and subsequently cleared by a mixture of hydrofluoric and sulphuric acids and water of the light-screening substances produced thereon by the grinding operation without elimination of said cusps.

2. In a light conditioning system including a light source, a light directing and conditioning device of non-image-forming and non-image-retaining and efficient light transmitting characteristics and comprising a glass body having one of its optical faces abraded to a prescribed optical contour to provide a continuous optical surface comprising contiguous minute cusps and subsequently cleared by a mixture of hydrofluoric and sulphuric acids and water of the light-screening substances produced thereon by the abrading operation without the elimination of said cusps.

3. In a light conditioning system including a light source, a light directing and conditioning device of non-image-forming and non-image-retaining and efficient light transmitting characteristics and comprising a glass body having one of its optical faces roughened to conform generally to a prescribed optical contour to provide a continuous optical surface comprising contiguous minute cusps and subsequently cleared by a mixture of hydrofluoric and sulphuric acids and water of the light-screening substances produced thereon by the roughening operation without elimination of said cusps.

4. In a light conditioning system including a light source, a light directing conditioning reflector of non-image-forming and non-image-retaining and efficient light transmitting characteristics and comprising a glass body having one of its optical faces roughened to conform generally to a prescribed optical contour to provide a continuous optical surface comprising contiguous minute cusps and subsequently cleared by a mixture of hydrofluoric and sulphuric acids and water of the light-screening substances produced thereon by the roughening operation without elimination of said cusps.

5. In a light conditioning system including a light source, a light directing and conditioning device of non-image-forming and non-image-retaining and efficient light transmitting characteristics and comprising a glass body having one of its optical faces molded to a minutely uneven surface form conforming generally to a prescribed optical contour to provide a continuous optical surface comprising contiguous minute cusps subsequently cleared by a mixture of hydrofluoric and sulphuric acids and water of the light-screening substances produced thereon by the molding operation without elimination of said cusps.

6. The method of manufacturing a light directing and conditioning device comprising essentially the steps of forming on a glass stock piece an optical face portion having a minutely uneven surface which conforms generally to a prescribed optical contour and subsequently clearing said surface of light-screening substances by treating said surface with a mixture of sulphuric and hydrofluoric acids and water in which the ratio of sulphuric acid to hydrofluoric acid is of the order of 5 to 1.

7. The method of manufacturing a light directing and conditioning device comprising essentially the steps of forming on a glass stock piece an optical face portion having a minutely uneven surface which conforms generally to a prescribed optical contour and subsequently clearing said surface of light-screening substances by treating said surface with a mixture of sulphuric and hydrofluoric acids and water in which the sulphuric acid ingredient is in preponderance relative to the hydrofluoric acid ingredient.

8. The method of manufacturing a light directing and conditioning device comprising essentially the steps of forming on a glass stock piece an optical face portion having a minutely uneven surface which conforms generally to a prescribed optical contour and subsequently clearing said surface of light-screening substances by treating said surface with a mixture of sulphuric and hydrofluoric acids and water, the relative proportions of the ingredients of said mixture and the duration of said treatment being regulated so as to provide efficient clearing of said surface without elimination of the unevenness thereof.

9. As a new article of manufacture, a light directing and conditioning device substantially identical with that obtained by the method of claim 6.

10. As a new article of manufacture, a light directing and conditioning device substantially identical with that obtained by the method of claim 7.

11. As a new article of manufacture, a light directing and conditioning device substantially identical with that obtained by the method of claim 8.

12. In a light projection system arranged to illuminate a picture aperture, a light source, a light directing and conditioning condenser lens of non-image-forming and non-image-retaining and efficient light transmitting characteristics and comprising a glass lens having one of its optical faces roughened to conform generally to a prescribed optical contour to provide a continuous optical surface comprising contiguous minute cusps and subsequently cleared by a mixture of hydrofluoric and sulphuric acids and water of the light-screening substances produced thereon by the roughening operation without elimination of said cusps, said light source and condenser lens being arranged to project light from said light source so as to illuminate said picture aperture.

13. In a light projection system, an aperture to be illuminated, a light source, a light directing and conditioning condenser lens having one of its optical faces shaped to a minutely uneven surface form which conforms generally to a prescribed optical contour to provide a continuous optical surface comprising contiguous minute cusps subsequently cleared by a mixture of hydrofluoric and sulphuric acids and water of the light-screening substances produced thereon by the shaping operation without elimination of said cusps, said light source and said lens being so relatively arranged as to project a uniformly dispersed light beam upon said light aperture.

EARL W. BECK.
VICTOR WALKER.